(12) United States Patent
Schliwa-Bertling et al.

(10) Patent No.: US 10,117,276 B2
(45) Date of Patent: Oct. 30, 2018

(54) IMSI ACQUISITION BY BASE STATION CONTROLLER

(71) Applicant: Telefonaktiebolaget LM Ericsson (publ), Stockholm (SE)

(72) Inventors: Paul Schliwa-Bertling, Ljungsbro (SE); Jari Vikberg, Järna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 82 days.

(21) Appl. No.: 14/917,375

(22) PCT Filed: Sep. 9, 2013

(86) PCT No.: PCT/SE2013/051043
§ 371 (c)(1),
(2) Date: Mar. 8, 2016

(87) PCT Pub. No.: WO2015/034408
PCT Pub. Date: Mar. 12, 2015

(65) Prior Publication Data
US 2016/0219630 A1    Jul. 28, 2016

(51) Int. Cl.
*H04W 4/00* (2018.01)
*H04W 76/02* (2009.01)
(Continued)

(52) U.S. Cl.
CPC ............. *H04W 76/02* (2013.01); *H04W 8/26* (2013.01); *H04W 36/0066* (2013.01);
(Continued)

(58) Field of Classification Search
CPC combination set(s) only.
See application file for complete search history.

(56) References Cited

U.S. PATENT DOCUMENTS

2005/0233729 A1    10/2005    Stojanovski et al.
2008/0070601 A1*    3/2008    Brueckheimer ........ H04W 4/14
                                                    455/466

(Continued)

FOREIGN PATENT DOCUMENTS

| CN | 102638854 A | 8/2012 |
| EP | 2227060 A2 | 9/2010 |
| WO | 2010073098 A1 | 7/2010 |

OTHER PUBLICATIONS

"3rd Generation Partnership Project; Technical Specification Group GSM/EDGE Radio Access Network; Dual Transfer Mode (DTM); Stage 2 (Release 11)", 3GPP Draft; 43055-B10, 3rd Generation Partnership Project (3GPP), Mobile Competence Centre; 650, Route des Lucioles; F-06921 Sophia-Antipolis Cedex, France, Mar. 5, 2013, XP050906405, 49 pages.

(Continued)

*Primary Examiner* — Yemane Mesfin
*Assistant Examiner* — Mon Cheri Davenport
(74) *Attorney, Agent, or Firm* — Rothwell, Figg, Ernst & Manbeck, P.C.

(57) ABSTRACT

Methods and apparatus are disclosed for enabling a wireless device engaging in a circuit-switched connection with a base station controller in a GSM network to access a Wi-Fi radio access network. The location information of the wireless device in the GSM network is provided to the Wi-Fi access controller using a location function. The base station controller serving the wireless device updates a location function with the current location of the wireless device, and the Wi-Fi access controller obtains the current location of the wireless device from the location function.

14 Claims, 8 Drawing Sheets

(51) Int. Cl.
  *H04W 76/00*   (2018.01)
  *H04W 8/26*    (2009.01)
  *H04W 36/00*   (2009.01)
  *H04W 64/00*   (2009.01)
  *H04W 76/10*   (2018.01)
  *H04W 92/22*   (2009.01)
  *H04W 84/04*   (2009.01)
  *H04W 84/12*   (2009.01)
  *H04W 88/06*   (2009.01)
  *H04W 88/12*   (2009.01)

(52) U.S. Cl.
  CPC ......... *H04W 64/00* (2013.01); *H04W 76/00* (2013.01); *H04W 76/10* (2018.02); *H04W 84/042* (2013.01); *H04W 84/12* (2013.01); *H04W 88/06* (2013.01); *H04W 88/12* (2013.01); *H04W 92/22* (2013.01)

(56) References Cited

U.S. PATENT DOCUMENTS

| | | | | |
|---|---|---|---|---|
| 2008/0305768 A1* | 12/2008 | Nylander | ............. | H04W 12/06 455/410 |
| 2010/0215001 A1* | 8/2010 | Russell | ................ | H04L 63/062 370/329 |
| 2010/0220680 A1 | 9/2010 | Ramankutty et al. | | |

OTHER PUBLICATIONS

TELECOMINFO, "RG20—Precise Paging", Telecomsource Forum, Sep. 8, 2012, XP55131421, 5 pages.

Mahapatra, A., et al., "Authentication in an integrated 802..1X based WLAN and CDMA2000-1X network", Communications, 2003, APCC 2003, The 9th Asia-Pacific Conference on Sep. 21-24, 2003, Piscataway, NJ, USA, IEEE, vol. 1, Sep. 21, 2003, XP010688178, pp. 227-231.

Supplementary European Search Report dated Jun. 28, 2016 in corresponding European Application No. 13892836.1, 6 pages.

"3rd Generation Partnership Project; Technical Specification Group Core Network and Terminals; Mobile radio interface Layer 3 specification; Core network protocols; Stage 3 (Release 11)", 3GPP TS 24.008 V11.7.0, (Jun. 2013) 667 pages.

"3rd Generation Partnership Project; Technical Specification Group GSME/EDGE Radio Access Network; Mobile Switching Centre—Base Station System (MSC-BSS) interface; Layer 3 specification (Release 11)", 3GPP TS 48.008, V11.5.0, (May 2013), 227 pages.

"3rd Generation Partnership Project; Technical Specification Group Services and System Aspects; Architecture enhancements for non-3GPP accesses (Release 12)", 3GPP TS 23.402, V12.1.0, (Jun. 2013), 254, pages.

* cited by examiner

IMSI ACQUISITION BY BASE STATION CONTROLLER

CROSS-REFERENCE TO RELATED APPLICATION

This application is a 35 U.S.C. § 371 National Phase Entry Application from PCT/SE2013/051043, filed Sep. 9, 2013, and designating the United States.

TECHNICAL FIELD

The present invention relates generally to integration of a Wi-Fi radio access network into a 3GPP communications network and, more specifically, to exchange of data between a Wi-Fi radio access network and a 3GPP radio access network.

BACKGROUND

Non-3GPP radio access technology deployments like WLAN are becoming popular among 3GPP operators for off-loading traffic in cellular networks. For example, a mobile terminal may be directed to use a Wi-Fi access point to gain access to a mobile core network. Usually, a Wi-Fi network can be hosted and controlled by an operator of a mobile network or by a third party such as a Wi-Fi operator or an end user. Often, Wi-Fi networks and mobile networks are deployed separately. Cooperation between a Wi-Fi radio access network and a mobile radio access network has been attempted but has not been standardized.

One common approach to selection of a radio access network is that "Wi-Fi is preferred" over other types of networks. Under such approach, a mobile terminal always attempts to access and associate with a newly detected Wi-Fi access point, without considering the current service level in other available access networks, for example, the 3GPP radio access network. Selecting a Wi-Fi network whenever it is available does not guarantee best performance.

There is a need for controlling or managing how or when a mobile terminal selects a non-3GPP radio access network or 3GPP radio access network for accessing a mobile core network.

SUMMARY

The present disclosure provides methods and apparatus for providing a mobile terminal's location in a mobile radio access network to a Wi-Fi radio access network, for example, to Wi-Fi Access Controller or to Wi-Fi Access Point. The mobile terminal's location is referenced using the identifier of the base station controller the UE is connected to. In the present disclosure, the terms "UE," "wireless device," and "mobile terminal/station" are used to refer to a user device configured to communicate with a wireless network. These terms are used interchangeably.

In some embodiments, a method is implemented at a base station controller for retrieving an IMSI number of a wireless device from a mobile switching center. The wireless device is engaging in a circuit-switched connection served by the base station controller and is not configured to support Dual Transfer Mode (DTM). The method comprises sending a first message to the mobile switching center falsely indicating that the wireless device is configured to support DTM, even though the wireless device does not support DTM. In response to the first message, the IMSI number of the wireless device is received from the mobile switching center. The method further comprises sending a second message to the mobile switching center indicating that the wireless device is not configured to support DTM, in order to correct the false indication sent by the first message. The retrieved IMSI of the wireless device is associated with the base station controller identifier of the wireless device's serving base station controller. A location function is updated with the association of the IMSI of the wireless device with the base station controller identifier.

In some embodiments, a base station controller is configured to retrieve an International Mobile Subscriber (IMSI) number of a wireless device from a mobile switching center. The wireless device is engaged in a circuit-switched connection served by the base station controller. The wireless device is not configured to support Dual Transfer Mode (DTM). The base station controller comprises a first network interface, a second network interface, and a processor. The first network interface is configured to transmit and receive messages to and from the mobile switching center. The second network interface is configured to communicate with a location function. The processor is configured to retrieve the IMSI number of the wireless device from a mobile switching center via the first network interface, associate the retrieved IMSI number of the wireless device, and update the location function via the second network interface with the retrieved IMSI number and the associated base station controller identifier. To retrieve the IMSI number of the wireless device from a mobile switching center, the base station controller sends a first message to the mobile switching center falsely indicating that the wireless device is configured to support DTM. In response, the base station controller receives from the mobile switching center the IMSI number of the wireless device. Afterwards, the base station controller sends a second message to the mobile switching center to correct the false indication of the first message by indicating that the wireless device does not support DTM.

In some embodiments, a method is implemented at a Wi-Fi access controller for querying a location of a wireless device attempting to connect to a Wi-Fi network. The wireless device is engaging in a circuit-switched connection served by a base station controller. The method comprises determining an International Mobile Subscriber Identity (IMSI) of the wireless device and sending a location query to a location function. The location query includes the IMSI of the wireless device. In response to the location query, a base station controller identifier of the base station controller is received from the location function. The base station controller identifier is then used to establish communication between the Wi-Fi access controller and the base station controller.

In some embodiments, a Wi-Fi access controller in a Wi-Fi network is configured to communicate with a base station controller in a GSM network. The Wi-Fi access controller comprises a first network interface, a second network interface, and a processor. The first network interface is configured to communicate with the base station controller. The second network interface is configured to communicate with a location function. The processor is configured to receive an access attempt from a wireless device that is engaging in a circuit-switched connection served by the base station controller. The processor is further configured to determine the base station controller identifier of the base station controller serving the wireless device and use the base station controller identifier to establish communication with the base station controller via the first network interface. To determine the identifier of the base station controller, the processor is configured to determine the IMSI of the wireless device and send a location query to the location function via the second network interface. The location query includes the IMSI of the wireless device. In response to the location query, the Wi-Fi access controller receives the base station controller identifier from the location function via the second network interface.

Of course, the present invention is not limited to the features, advantages, and contexts summarized above, and those familiar with wireless communications technologies will recognize additional features and advantages upon reading the following detailed description and upon viewing the accompanying drawings.

DETAILED DESCRIPTION

Figure 1:
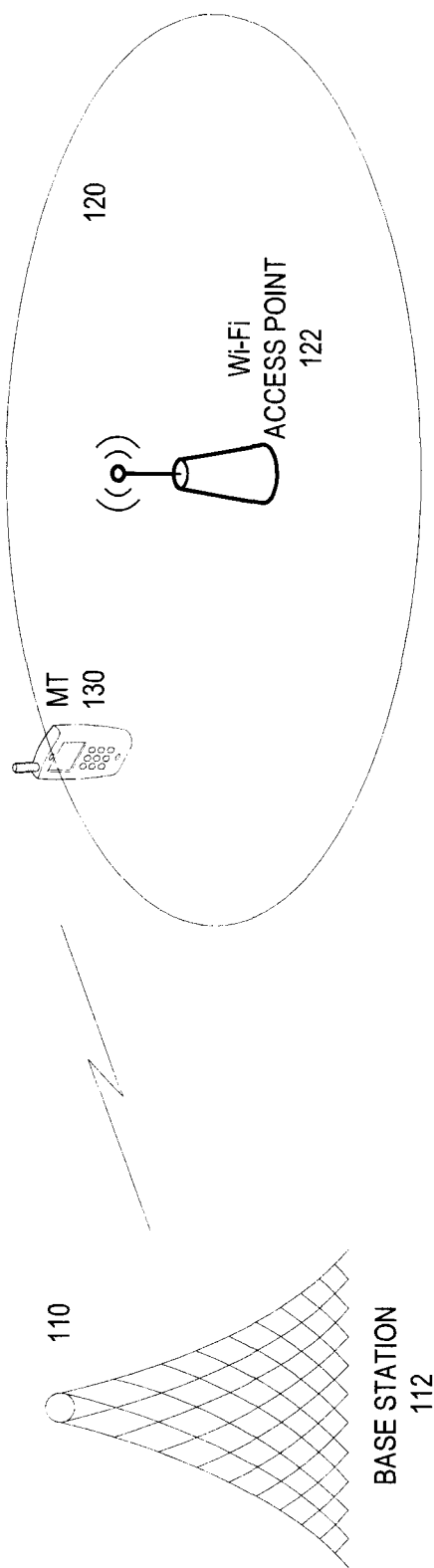
FIG. 1 illustrates a wireless network comprising two radio access networks, a 3GPP access network and a Wi-Fi access network.
Figure 2:
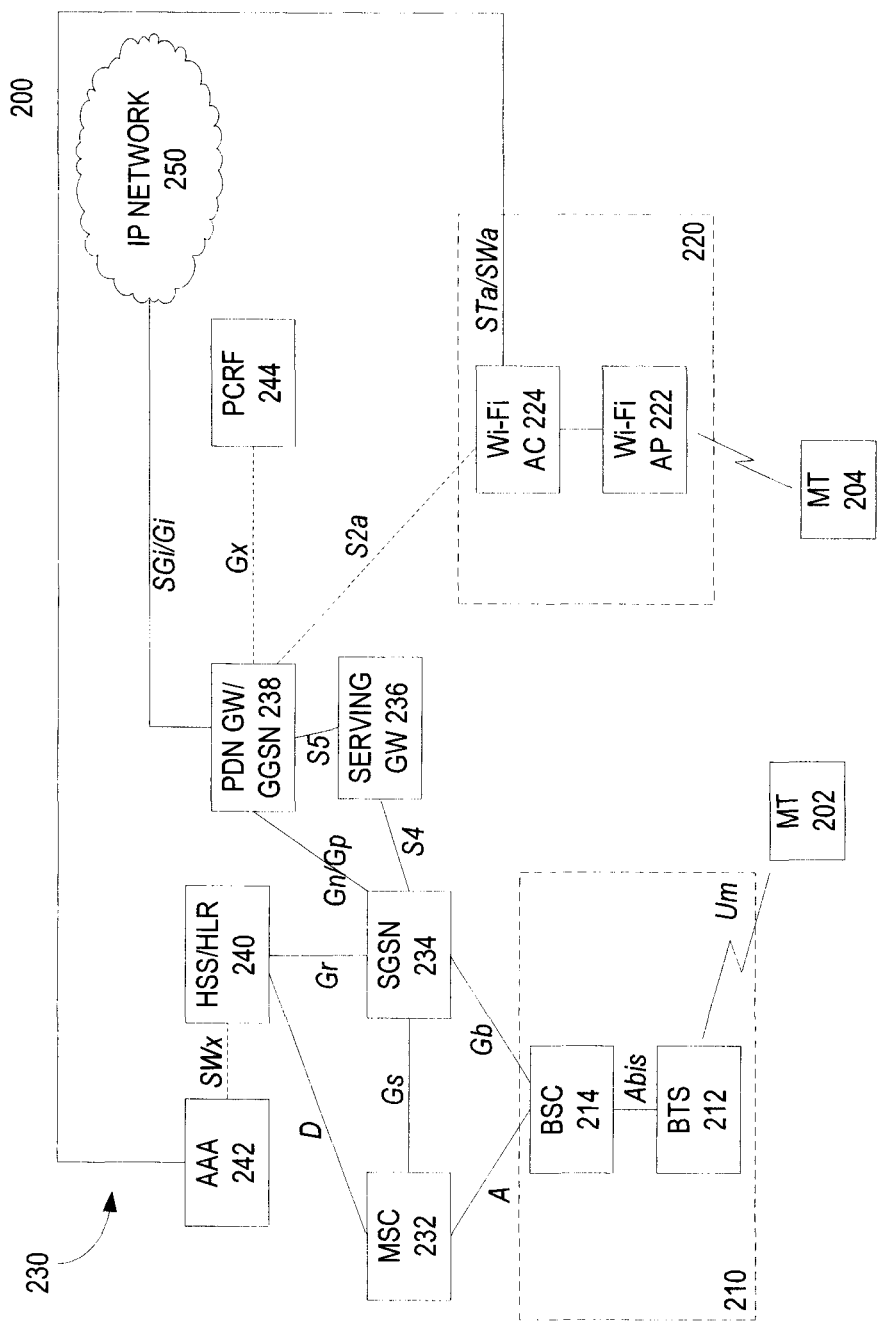
FIG. 2 illustrates an exemplary integrated wireless network comprising a 3GPP radio access network and a Wi-Fi radio access network.

Referring now to the drawings, FIG. 1 illustrates two radio access networks, 110 and 120, that provide access to a mobile core network 230 (shown in FIG. 2). The radio access network 110 is a 3GPP radio access network and comprises a base station 112. The radio access network 120 is a Wireless Local Area Network (WLAN) and comprises a Wi-Fi Access Point (AP) 122. A mobile terminal 130 can connect to the mobile core network 230 via either the radio access network 110 or the Wi-Fi access network 120. In FIG. 1, the mobile terminal 130 is engaged in a circuit-switched call served by the base station 112. The mobile terminal 130 detects the Wi-Fi AP 122 when it moves into the coverage area of the WLAN network 120.

While a WLAN network 120 is often deployed and managed separately from a cellular network 110, integrating the WLAN network 120 into the cellular network 110 offers improved end user experience. For instance, services that are normally available only in the cellular network 110 can be made available to WLAN users. Examples of such services include parental control, subscription-based payment methods, etc. Integrating the WLAN network 120 into the cellular network 110 includes providing common authentication and provisioning procedures for users of both networks and off-loading traffic between the two networks. For example, for authentication and provisioning, automatic SIM (Subscriber Identity Module) or USIM (Universal Subscriber Identity Module) based authentication can be used as the common procedure for both networks.

Different solutions for integrating of a 3GPP and a Wi-Fi network have been or are being standardized. For example, overlay solutions were initially specified in Release 8 (Rel-8) of 3GPP standard TS 23.402, of which the latest revision in Rel-8 is 3GPP TS 23.402 V8.10.0. The overlay solutions are described in 3GPP TS 23.402 as solutions based on the S2b and S2c reference points (interfaces). These solutions have further evolved and the latest version of 3GPP TS 23.402 in 3GPP Rel-12 is V12.1.0. In addition, an integrated solution based on S2a reference point (interface) was initially standardized in 3GPP TS 23.402 Rel-8 and is currently in the process of being further enhanced with additional capabilities in 3GPP Rel-12.

FIG. 2 illustrates an exemplary integrated wireless network 200. The wireless network 200 includes mobile terminals 202 and 204, a 3GPP radio access network 210, a Wi-Fi radio access network 220, and a mobile core network 230 that is connected to an IP network 250.

The 3GPP radio access network 210 includes a base station 212 and a base station controller (BSC) 214, connected via an Abis interface. The 3GPP radio access network 210 provides the mobile terminal 202 access to the mobile core network 230 via an air interface (Um interface).

The Wi-Fi radio access network 220 includes a Wi-Fi Access Point (AP) 222 and a Wi-Fi Access Controller (AC) 224. The Wi-Fi radio access network 220 provides the mobile terminal 202 access to the mobile core network 230 via a Wi-Fi connection, e.g., over interface based on IEEE 802.11 family of specifications and/or Wi-Fi Alliance specifications.

As in a standard 3GPP network, the 3GPP radio access network 210 is connected to typical GSM (Global System for Mobile communications) core network nodes, such as a Mobile Switching Center (MSC) 232 and a Serving GPRS Support Node (SGSN) 234. The BSC 214 is connected to the MSC 232 via an "A" interface and connected to the Serving GPRS Support Node (SGSN) 234 via a "Gb" interface. The mobile core network 230 further includes a serving Gateway (GW) 236, a Packet Data Network (PDN) Gateway (GW) or Gateway GPRS Support Node (GGSN) 238, a Home Location Register/Home Subscriber Server (HLR/HSS) 240, and an Authentication Authorization Accounting (AAA) node 242. Various network interfaces interconnect these network nodes to form the mobile core network 230. For instance, interface "D" connects the MSC 232 and the HSS/HLR 240. Interfaces "S4," "Gr," "Gs," and "Gn/Gp" connect the SGSN 234 to the Serving GW 236, the HSS/HLR 240, the MSC 232, and the PDN GW/GGSN 238 respectively.

The PDN GW/GGSN 238 connects the mobile core network 230 to the IP network 250 via interface "SGi/Gi." The PDN GW/GGSN 238 serves as a gateway to the packet data network (IP network) 250 for the mobile terminals 202, 204. The PDN GW/GGSN 238 provides the mobile terminals 202, 204 access to packet data services offered by the IP network 250. The PDN GW 238 is also connected, via a Gx Interface, to the Policy and Charging Rules Function (PCRF) 244 node, which stores subscription data and provides policy rules governing subscribed services.

As an example, FIG. 2 shows that the Wi-Fi access network 220 is integrated into the mobile core network 230 via interface "S2a," using the integration solution that is currently being enhanced. The Wi-Fi access network 220 is also connected to the AAA node 242 via interface "STa/SWa."

In FIG. 2, the interface between the Wi-Fi access network 220 and the mobile core network 230 is implemented between the Wi-Fi AC 224 and the PDN GW/GGSN 238. In some embodiments, the Wi-Fi access network 220 may include a Broadband Network Gateway (BNG) or a Residential Gateway (RG). The interface between the Wi-Fi access network 220 and the mobile core network 230 may be implemented at the BNG or RG, instead of the Wi-Fi AC 224.

The integrated network 200 shown in FIG. 2 can be configured to support access network selection and to provide 3GPP services to Wi-Fi network users. These functionalities rely on the availability of data or information related to mobile terminal mobility, 3GPP cell characteristics, network capacity or load, and radio link performance. One method of acquiring the needed information is by sharing a mobile terminal's context in the 3GPP radio access network with the Wi-Fi network. This enables a network entity, e.g., a BSC, a Wi-Fi AC, or a more central node, to select an access network for the mobile terminal 202 based on whether the mobile terminal 202 is stationary or moving and/or whether the mobile terminal 202 has a good connection to the Wi-Fi AP 222.

Besides the functionality of selecting a radio access network for the mobile terminal 202 or 204, the integrated network in FIG. 2 can perform authentication of a mobile terminal 204 that is attempting to access the Wi-Fi access network 220. In some embodiments, the International Mobile Subscriber Identity (IMSI) is used as part of the AKA (Authentication and Key Agreement) protocol signaling via the Wi-Fi AC 224 and via the STa/SWa interface. For example, the mobile terminal 204 may use the IMSI towards the AAA server 242 (via the Wi-Fi AC 224) as part of the EAP-SIM/AKA/AKA' signaling or the AAA server 242 may return the IMSI to the Wi-Fi AC 224 after successful authentication of the mobile terminal 204.

The integrated network in FIG. 2 can also perform traffic steering between the 3GPP access network and the Wi-Fi access network. In one embodiment, a mobile terminal 202 engaged in a circuit-switched call or connection in the 3GPP network 210 may be directed to the Wi-Fi access network 220 after detecting the Wi-Fi AP 222. Switching the mobile terminal 202 from the 3GPP access network 210 to the Wi-Fi access network 220 can relieve heavy traffic currently handled by the 3GPP network 210. However, switching is not preferred if no performance gain can be achieved. In some embodiments, the decision on whether to switch from the 3GPP access network 210 to the Wi-Fi network 220 can be made by the BSC 214 or the Wi-Fi AC 224, which requires coordination between the two nodes. When the Wi-Fi AC 224 receives an access attempt from a mobile terminal 202 already engaged in a circuit-switched connection with the BSC 214, the Wi-Fi AC 224 needs the identity of the BSC 214 to which the mobile terminal 202 is currently connected. In some embodiments, the Wi-Fi AC 224 retrieves the BSC identifier of the BSC 214 from a location function 302 shown in FIG. 3.

Figure 3:
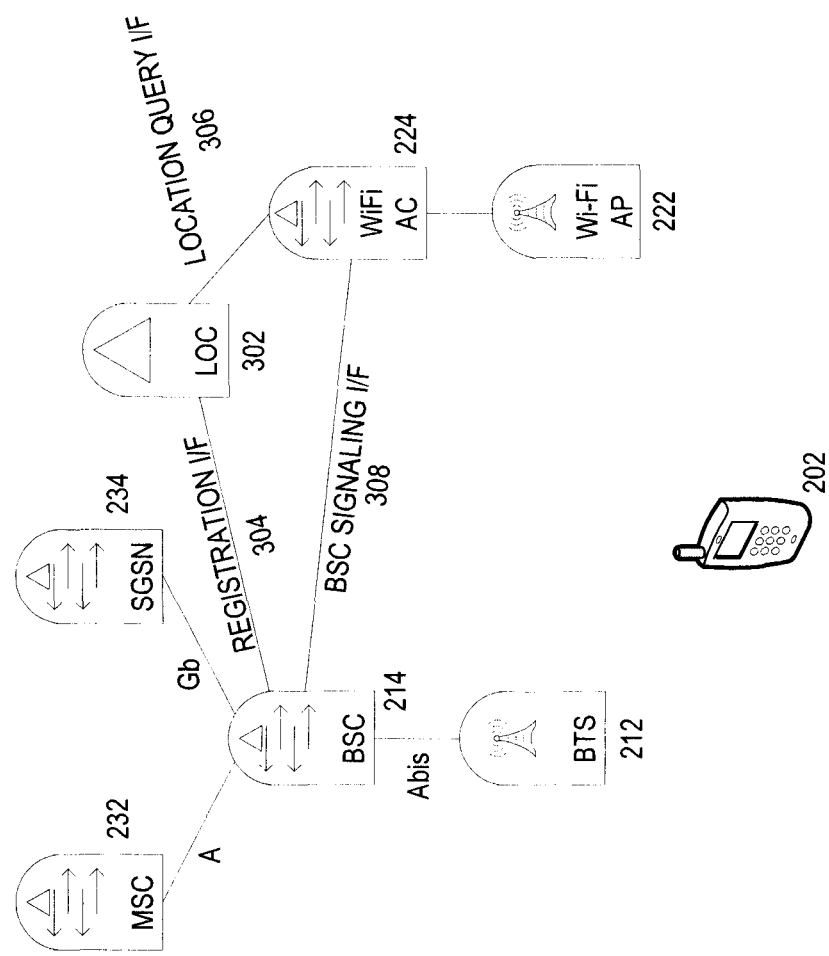
FIG. 3 illustrates various network interfaces between different network nodes in an exemplary wireless network.

FIG. 3 illustrates a simplified wireless network comprising part of the mobile core network 230, the 3GPP access network 210, and the Wi-Fi access network 220. The 3GPP access network 210 and the Wi-Fi access network 220 both are connected to the location function 302. The BSC 214 and the location function 302 are connected via a Registration Interface 304. The location function 302 and the Wi-Fi AC 224 are connected via a location query interface 306. Between the BSC 214 and the Wi-Fi AC 224, a BSC signaling interface 308 is implemented. In some embodiments, the BSC signaling interface 308 may be implemented as a control plane interface.

The location function 302 is implemented to store the location of every mobile terminal, for example, every active mobile terminal 202. The location function 302 stores the IMSI of the mobile terminal 202 along with the BSC identifier of the serving BSC 214 of the mobile terminal 202. In FIG. 3, the location function 302 is shown as an entity independent of the BSC 214 and the Wi-Fi AC 224. In some embodiments, the location function may be implemented as a functional entity at either the BSC 214 or the Wi-Fi AC 224.

The location data of each active mobile terminal stored by the location function 302 is supplied by the BSC 214 via a Registration Interface 304. For example, the BSC 214 retrieves the IMSI of the mobile terminal 202 and sends a message to update the Location Function 302 with the IMSI of the mobile terminal 202 and the associated BSC identifier.

In some embodiments, the MSC 232 is required by the 3GPP standard to supply the BSC 214 with the IMSI of the mobile terminal 202. For example, when the mobile terminal 202 supports Dual Transfer Mode (DTM), the BSC 214 sends a 3GPP 48.008 CLASSMARK UPDATE message to the MSC 232 to inform the MSC 232 that the mobile terminal 202 supports DTM. In return, the MSC 232 sends the IMSI of the mobile terminal 202 to the BSC 214.

When the mobile terminal 202 does not support DTM, the standard does not require that the MSC 232 provide the mobile terminal 202's IMSI to the BSC 214. In order to obtain the IMSI of the mobile terminal 202, the BSC 214 can be configured to send a 3GPP 48.008 CLASSMARK UPDATE message to the MSC 232 falsely indicating that the mobile terminal 202 supports DTM. The MSC 232, upon receiving the message, sends the IMSI of the mobile terminal 202 to the BSC 214 as required by the 3GPP standard. The BSC 214, after acquiring the IMSI of the mobile terminal 202, sends another 3GPP 48.008 CLASSMARK UPDATE message to the MSC 232. The second message does not indicate DTM capability. The second message informs the MSC 232 that the mobile terminal 202 does not support DTM and is used to "correct the record" at the MSC 232.

After acquiring the IMSI of the mobile terminal 202, the BSC 214 updates the location function 302 with its own identifier associated with the IMSI of the mobile terminal 202. The update message from the BSC 214 may be sent via the Registration Interface 304. The location function 302 is configured to provide the location of a mobile terminal in response to a location query.

To obtain the location of the mobile terminal 202, the Wi-Fi AC 224 queries the location function 302 via the Location Query Interface 306. The query includes the IMSI of the mobile terminal 202, which may be obtained by the Wi-Fi AC 224 during the authentication procedure of the mobile terminal 202. In response, the Wi-Fi AC 224 receives the BSC identifier of the serving BSC 214 of the mobile terminal 202. With the knowledge of the mobile terminal's location, the Wi-Fi AC 224 can signal the serving BSC 214, via the BSC signaling interface 308, to coordinate in decisions regarding traffic off-loading, access network selection, etc.

Figure 4:
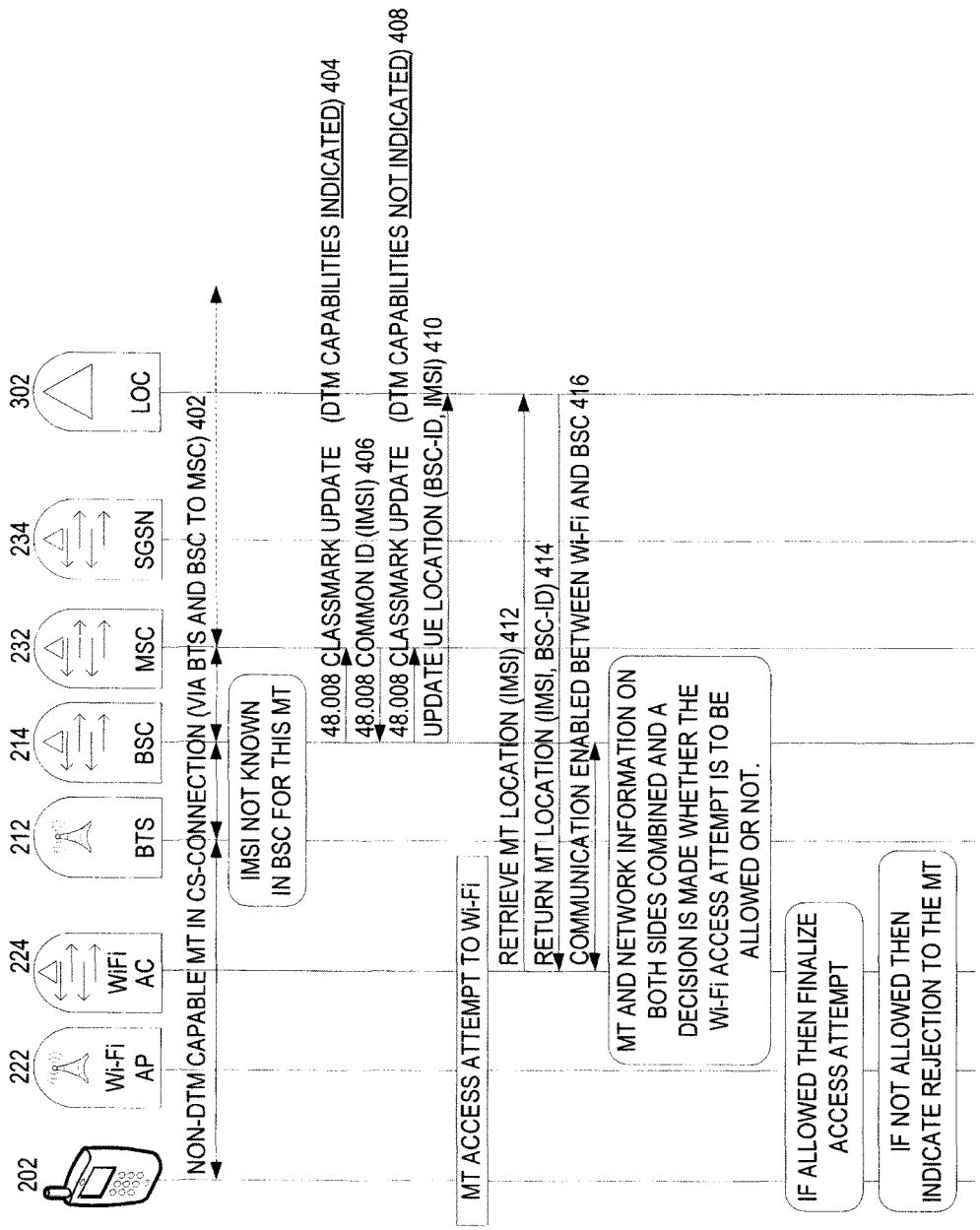
FIG. 4 illustrates an exemplary message flow by a UE to access a Wi-Fi access network.

FIG. 4 illustrates the message flow between the various network nodes in the above described process. The mobile terminal 202, which is a non-DTM capable device, initiates a circuit-switched connection with the BTS 212 (step 402). The mobile terminal 202 also maintains connection with the BSC 214 and the MSC 232 via the BTS 212. When the IMSI of the mobile terminal 202 is unknown to the BSC 214, the BSC 214 retrieves it from the MSC 232 (step 404-step 408).

In step 404, the BSC 214 sends a 48.008 CLASSMARK UPDATE (DTM capabilities indicated) message to the MSC 232. In return, the BSC 214 receives the IMSI of the mobile terminal 202 in a 48.008 COMMON ID message (step 406). The BSC 214 then sends a second 48.008 CLASSMARK UPDATE message to the MSC 232 (step 408). The second message does not include an indication of DTM capabilities (step 408). The BSC 214 also sends a message to the location function 302 to update the UE location (step 410). The message includes the BSC identifier of the BSC 214 and the IMSI of the mobile terminal 202.

While the mobile terminal 202 is engaging in the circuit-switched connection with the BTS 212, the mobile terminal 202 detects a Wi-Fi access network 220 and attempts access to the Wi-Fi access network 220. The Wi-Fi AC first retrieves the IMSI of the mobile terminal 202 (for example from the mobile terminal 202 or from the AAA server 242). The Wi-Fi AC 224 in the Wi-Fi access network 220 then contacts the location function 302 to obtain the location of the mobile terminal 202 (step 412-step 416). The Wi-Fi AC 224 sends a location query to the location function 302 (step 412). The location query includes the IMSI of the mobile terminal 202. In response to the location query, the location function 302 retrieves the BSC identifier associated with the IMSI in the location query and returns the BSC identifier to the Wi-Fi AC 224 (step 414). Using the BSC identifier, the Wi-Fi AC 224 begins signaling the BSC 214 via the signaling interface 308 (step 416).

Between the Wi-Fi AC 224 and the BSC 214, a decision is made with regard to whether the mobile terminal 202 shall be allowed to access the Wi-Fi access network 220. The decision may be based on information about the mobile terminal 202, the 3GPP access network 210, and the Wi-Fi access network 220. If the mobile terminal 202 is allowed to access the network, the Wi-Fi AC 224 processes the access attempt. If not allowed, the mobile terminal 202 is notified of the rejection.

At the BSC 214, information about the mobile terminal 202 is stored as mobile terminal context. In some embodiments, to facilitate decision making, the BSC 214 can retrieve the mobile terminal context using the terminal's IMSI to search a database. Alternatively, the BSC 214 can use a pointer to access the mobile terminal context without searching. In some embodiments, the location function 302 can be implemented to store a pointer to each mobile terminal's context maintained at the BSC 214. For example, the BSC 214 may use a local wireless device identifier as a pointer or indicator for fast retrieval of the mobile terminal's context. The local wireless device identifier may be implemented as a 32-bit integer (4 octets). The BSC 214 sends the local wireless device identifier to the location function 302 to be stored along with the BSC identifier and the IMSI of the mobile terminal 202. The Wi-Fi AC 224 retrieves the local wireless device identifier from the location function 302 using the IMSI of the mobile terminal 202. The local wireless device identifier can be retrieved along with the BSC identifier or separately from the BSC identifier. The Wi-Fi AC 224 sends the retrieved local wireless device identifier to the BSC 214 using the BSC signaling interface 308. Using the local wireless identifier received from the Wi-Fi AC 224, the BSC 214 can quickly retrieve the mobile terminal 202's context.

Figure 5:
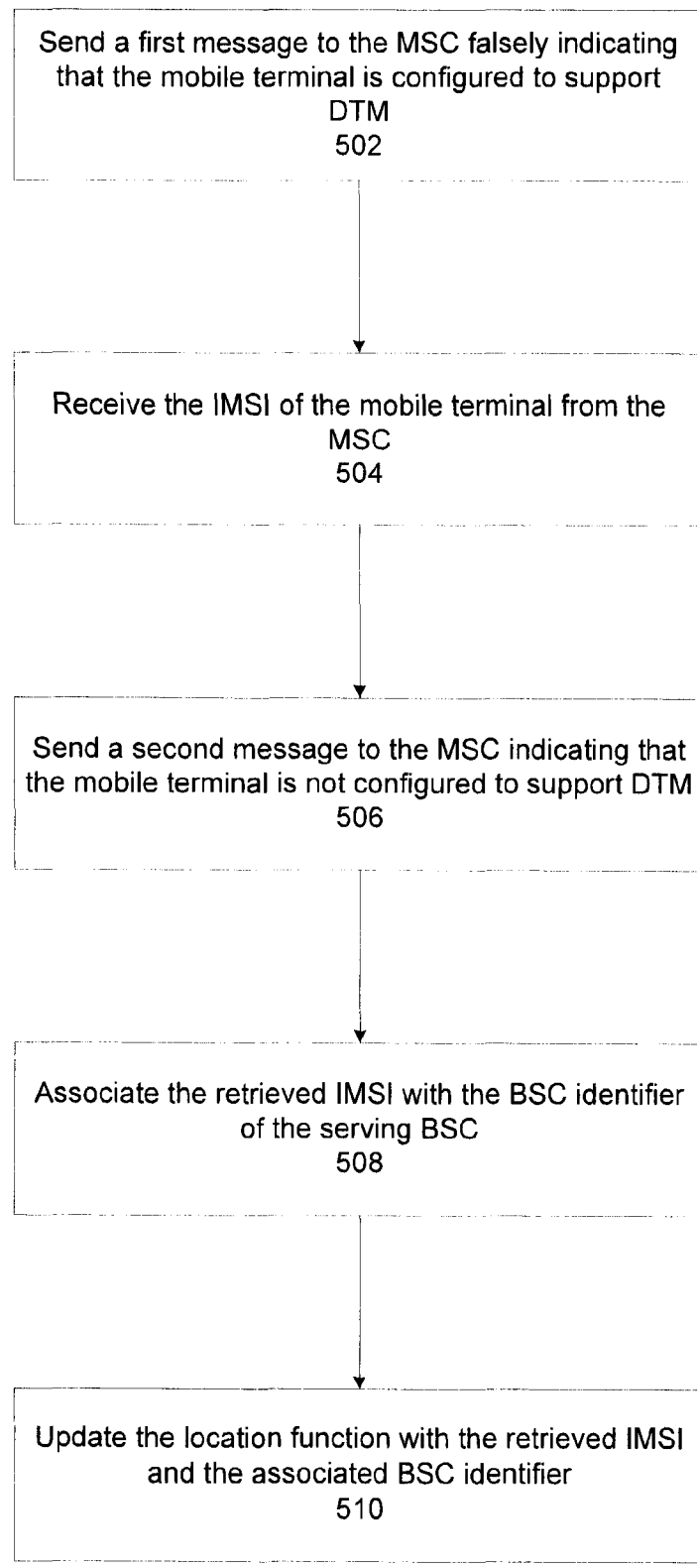
FIG. 5 illustrates an exemplary flow chart illustrating a method implemented at a base station controller for retrieving an IMSI of a mobile terminal.

FIG. 5 is an exemplary flow chart illustrating a method implemented at the BSC 214 for retrieving the IMSI of the mobile terminal 202. The mobile terminal 202 is engaging in a circuit-switched connection served by the BSC 214. The mobile terminal 202 does not support DTM. The BSC 214 sends a first message to the MSC 232 falsely indicating that the mobile terminal 202 is configured to support DTM (step 502). The BSC 214 receives the IMSI number of the mobile terminal 202 from the MSC 232 (step 504). The BSC 214 then sends a second message to the MSC 232 indicating that the mobile terminal 202 is not configured to support DTM (step 506). After having retrieved the IMSI of the mobile terminal 202, the BSC 214 associates the retrieved IMSI with the identifier of the BSC 214 (step 508) and updates the location function 302 with the retrieved IMSI and the associated BSC identifier (step 510).

Figure 6:
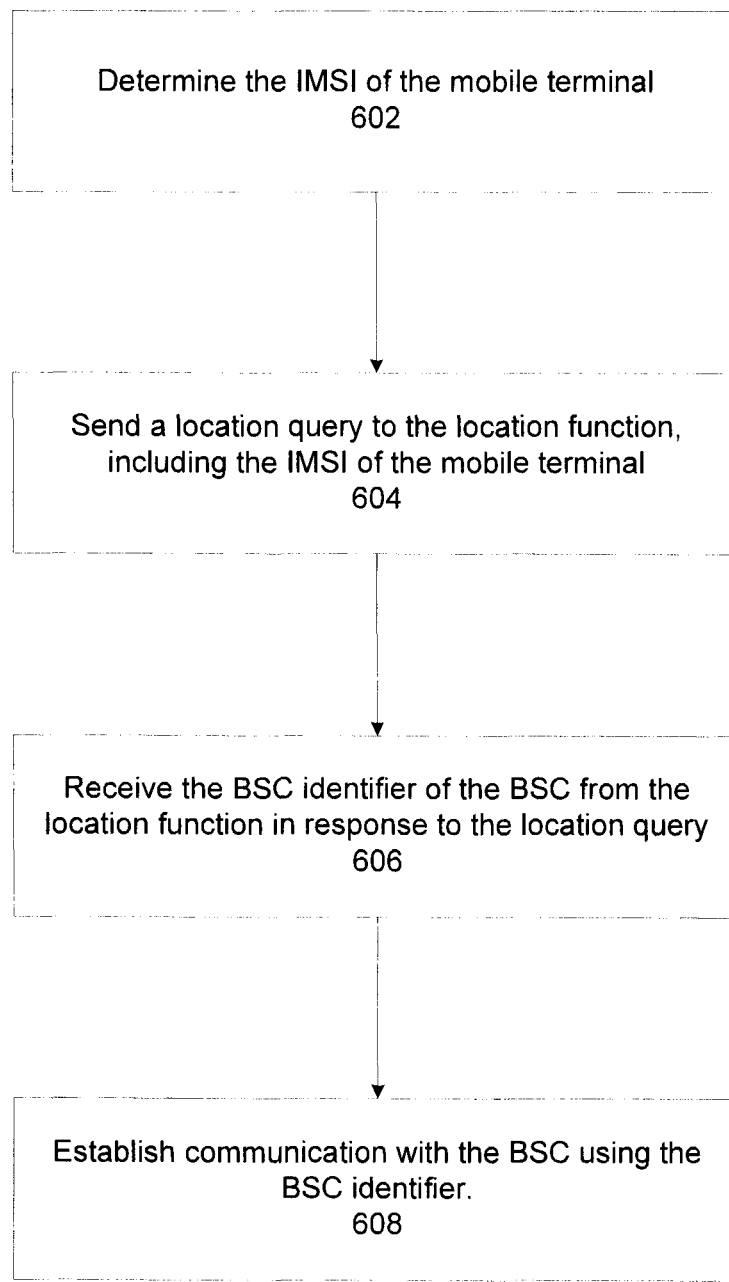
FIG. 6 illustrates an exemplary flow chart illustrating a method implemented at a Wi-Fi access controller for querying a location of a mobile terminal.

FIG. 6 is an exemplary flow chart illustrating a method implemented at the Wi-Fi AC 224 for querying a location of the mobile terminal 202. The mobile terminal 202 attempts to gain access to the mobile core network 230 via the Wi-Fi network 220. The Wi-Fi AC 224 determines the IMSI of the mobile terminal 202 (step 602) and sends a location query to the location function 302. The location query includes the IMSI of the mobile terminal 202 (step 604). In response, the Wi-Fi AC 224 receives the BSC identifier of the BSC 214 from the location function (step 606). Using the received BSC identifier, the Wi-Fi AC 224 establishes communication with the BSC 214 (step 608).

Figure 7:
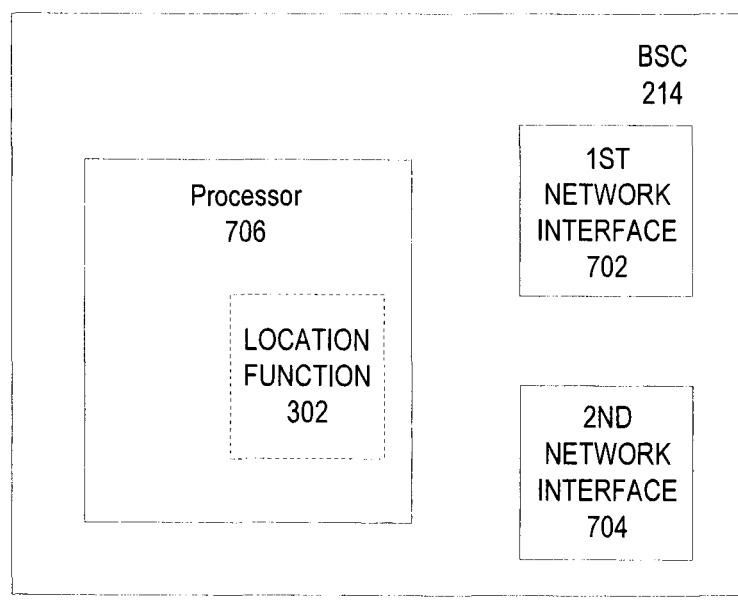
FIG. 7 is a block diagram illustrating an exemplary base station controller.

FIG. 7 illustrates an exemplary block diagram of the BSC 214 configured to perform the methods and techniques disclosed herein. The BSC 214 comprises a first network interface 702, a second network interface 704, and a processor 706. The first network interface 702 is configured to transmit and receive messages to and from the MSC 232. The second network interface 704 is configured to communicate with the location function 302. The location function 302 may be implemented at an independent network node, at the Wi-Fi AC 224, or at the BSC 214. If the location function 302 is implemented at the BSC 214 as shown in FIG. 7, the second network interface 704 may be implemented as an internal communication bus or data line.

The processor 706 is configured to send a first message via the first network interface to the MSC 232 falsely indicating that the mobile terminal 202 is configured to support DTM (DTM capable). The processor 706 is further configured to receive the IMSI number of the mobile terminal 202 from the MSC 232. The processor 706 sends a second message via the first network interface 702 to the MSC 232 indicating that the mobile terminal 202 is not configured to support DTM. The processor 706 then associates the retrieved IMSI number with the identifier of the BSC 214, and updates the location function 302 via the second network interface 704 with the retrieved IMSI number and the associated BSC identifier.

Figure 8:
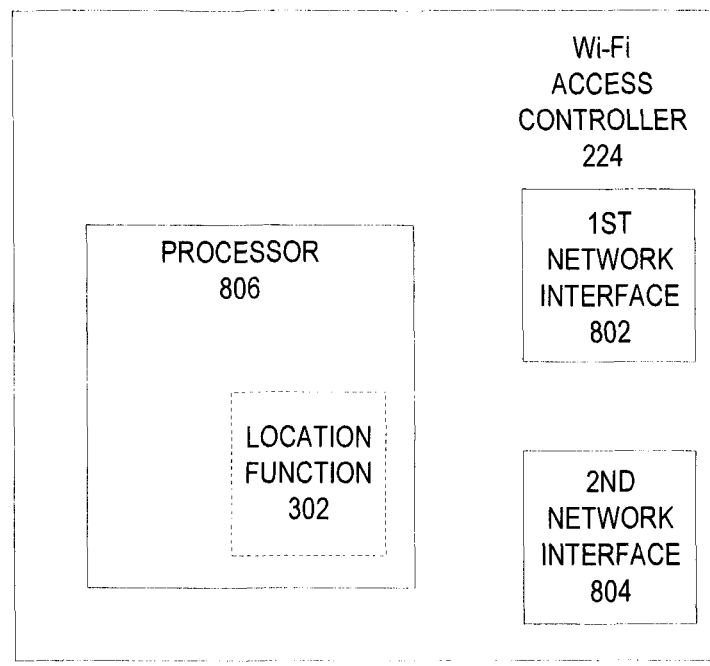
FIG. 8 is a block diagram illustrating an exemplary Wi-Fi access controller.

FIG. 8 illustrates an exemplary block diagram of the Wi-Fi access AC 224 configured to perform the methods and techniques disclosed herein. The Wi-Fi AC 224 comprises a first network interface 802, a second network interface 804, and a processor 806. The first network interface 802 is configured to communicate with the BSC 214. The second network interface 804 is configured to communicate with the location function 302. The processor 806 is configured to receive an access attempt from the mobile terminal 202 that is engaging in a circuit-switched connection served by the BSC 214. The processor 806 is further configured to determine the IMSI of the mobile terminal 202 and send a location query to the location function 302 via the second network interface. The location query includes the terminal's IMSI. In response to the location query, the processor 806 receives the BSC identifier of the BSC 214 via the second network interface. Using the identifier, the processor 806 then establishes communication with the BSC 214 via the first network interface. The location function 302 may be implemented at an independent network node, at the Wi-Fi AC 224, or at the BSC 214. If the location function 302 is implemented at the Wi-Fi access controller 224 as shown in FIG. 8, the second network interface 804 may be implemented as an internal communication bus or data line.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented at a base station controller of a 3GPP radio access network for retrieving an International Mobile Subscriber Identity (IMSI) number of a wireless device from a mobile switching center, said wireless device engaging in a circuit-switched connection served by the base station controller (BSC) and not configured to support Dual Transfer Mode (DTM), said method comprising:
   the BSC sending to the mobile switching center (MSC) a first message concerning the wireless device, wherein the wireless device is not configured to support DTM, and wherein the first message comprises information indicating falsely that said wireless device is configured to support DTM even though the wireless device is not configured to support DTM;
   the BSC receiving the IMSI number of said wireless device from the MSC;
   after receiving the IMSI number of said wireless device, the BSC sending a second message to the MSC, the second message indicating that said wireless device is not configured to support DTM; and
   after receiving the IMSI number of said wireless device, the BSC sending to a location function a location update message comprising the IMS number of the wireless device and a BSC identifier (BSC-ID) identifying the BSC.

2. The method of claim 1, further comprising:
   associating the retrieved IMSI number with a local wireless device identifier; and
   updating the location function with the retrieved IMSI number, the associated local wireless device identifier, and the associated base station controller identifier.

3. The method of claim 1, wherein the first message is a CLASSMARK UPDATE message with an indication of DTM capability.

4. The method of claim 3, wherein
   the second message is a CLASSMARK UPDATE message without an indication of DTM capability, and
   the BSC transmits the CLASSMARK UPDATE message to the MSC in response to receiving the IMSI from the MSC.

5. The method of claim 1, wherein the location function is located at the base station controller.

6. The method of claim 1, wherein the location function is located at a node separate from the base station controller.

7. The method of claim 6, wherein the node separate from the base station controller is a Wi-Fi access controller.

8. A base station controller (BSC) configured to retrieve an International Mobile Subscriber Identity (IMSI) number of a wireless device from a mobile switching center (MSC), said wireless device engaging in a circuit-switched connection served by the BSC and not configured to support Dual Transfer Mode (DTM), comprising:
   a first network interface for transmitting and receiving messages to and from the MSC;
   a second network interface for communicating with a location function; and
   a processor configured to:
   cause the MSC to provide the IMSI of the wireless to the BSC by sending to the MSC a first message concerning the wireless device, wherein the wireless device is not configured to support DTM, and wherein the first message comprises information indicating falsely that said wireless device is configured to support DTM even though the wireless device is not configured to support DTM;
   receive a response message transmitted by the MSC in response to the first message that comprises the information indicating falsely that said wireless device is configured to support DTM, wherein the response message transmitted by the MSC comprises the IMSI number of the wireless device;
   after receiving the response message comprising the IMSI number of the wireless device, send to the MSC a second message indicating that said wireless device is not configured to support DTM; and
   after receiving the IMSI number of the wireless device, send to a location function an location update message comprising the IMSI number of the wireless device and a BSC identifier identifying the BSC.

9. The base station controller of claim 8, wherein the processor is further configured to:
   associate the retrieved IMSI number with a local wireless device identifier; and
   update the location function via the second network interface with the retrieved IMSI number, the associated local wireless device identifier, and the associated base station controller identifier.

10. The base station controller of claim 8, wherein the first message is a CLASSMARK UPDATE message with an indication of DTM capability.

11. The base station controller of claim 8, wherein the second message is a CLASSMARK UPDATE message without an indication of DTM capability.

12. The base station controller of claim 8, wherein the location function is located at the base station controller.

13. The base station controller of claim 8, wherein the location function is located at a node separate from the base station controller.

14. The base station controller of claim 13, wherein the node separate from the base station controller is a Wi-Fi access controller.

* * * * *